US005660743A

United States Patent [19]

Nemchinsky

[11] Patent Number: 5,660,743

[45] Date of Patent: Aug. 26, 1997

[54] PLASMA ARC TORCH HAVING WATER INJECTION NOZZLE ASSEMBLY

[75] Inventor: Valerian Nemchinsky, Florence, S.C.

[73] Assignee: The ESAB Group, Inc., Florence, S.C.

[21] Appl. No.: 464,241

[22] Filed: Jun. 5, 1995

[51] Int. Cl.$^6$ .......... B23K 10/00

[52] U.S. Cl. .......... 219/121.5; 219/121.51; 219/121.49; 219/121.48; 219/75

[58] Field of Search .......... 219/121.48, 121.49, 219/121.39, 121.44, 121.5, 121.51, 121.59, 74, 75, 76.16

[56] References Cited

U.S. PATENT DOCUMENTS

| | | | |
|---|---|---|---|
| 3,534,388 | 10/1970 | Ito et al. | 219/121.51 |
| 3,833,787 | 9/1974 | Couch, Jr. . | |
| 4,311,897 | 1/1982 | Yerushalmy | 219/121 PP |
| 4,369,919 | 1/1983 | Beloev et al. | 219/121.5 |
| 4,390,772 | 6/1983 | Hiratake . | |
| 4,992,642 | 2/1991 | Kamp et al. . | |
| 5,023,425 | 6/1991 | Severance, Jr. . | |
| 5,124,525 | 6/1992 | Severance, Jr. et al. . | |

FOREIGN PATENT DOCUMENTS

| | | |
|---|---|---|
| 0 465 941 | 1/1992 | European Pat. Off. . |
| 2 078 586 | 1/1982 | United Kingdom . |
| WO91/02619 | 3/1991 | WIPO . |

*Primary Examiner*—Mark H. Paschall
*Attorney, Agent, or Firm*—Bell, Seltzer, Park & Gibson, P.A.

[57] ABSTRACT

A plasma arc torch having a nozzle assembly positioned adjacent the discharge end of the electrode of the torch, and wherein the nozzle assembly comprises a nozzle base defining an annular outer surface and a lower nozzle member defining an annular inner surface which is spaced from the outer surface so as to define an annular water passageway therebetween. The annular water passageway defines an angle with the longitudinal axis of the torch which is less than about 30° which provides both an efficient cooling of the nozzle assembly and constriction of the plasma arc, and without unduly cooling the plasma arc.

19 Claims, 3 Drawing Sheets

PLASMA ARC TORCH HAVING WATER INJECTION NOZZLE ASSEMBLY

BACKGROUND OF THE INVENTION

The present invention relates to a plasma arc torch having an improved water injection nozzle assembly.

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex of gas which forms the plasma arc, and in some torch designs the gas and arc are enveloped with a swirling jet of water. The injection of water serves to constrict the plasma jet and thus increase its cutting ability. The water is also helpful in cooling the nozzle assembly and thus increasing the life of the assembly.

While the benefits of the water injection system are recognized, it has been found that the injection of a sufficient amount of water to properly cool the nozzle assembly has the adverse effect of also cooling the plasma jet and thus reducing its cutting effectiveness. Thus, in existing torches, the dual objectives of achieving maximum cooling of the nozzle assembly, and proper restriction of the plasma jet without unduly cooling the jet, have not been realized.

It is accordingly an object of the present invention to provide a plasma arc torch having an improved nozzle assembly which effectively provides maximum cooling of the nozzle assembly and proper constriction of the arc without unduly cooling the arc.

SUMMARY OF THE INVENTION

The above and other objects and advantages of the present invention are achieved in the embodiment illustrated herein by the provision of a nozzle assembly for a plasma arc torch which comprises a nozzle base having a bore therethrough which defines a longitudinal axis and through which the plasma arc is adapted to be ejected. The nozzle base further includes an outer side which includes an annular outer surface which is coaxial with the longitudinal axis. A lower nozzle member is mounted to the outer side of the nozzle base and includes a discharge opening aligned with the longitudinal axis and positioned adjacent the bore of the nozzle base. Also, the lower nozzle member includes an annular inner surface which is spaced from and coaxial with the outer surface of the nozzle base so as to define an annular passageway therebetween. In accordance with the present invention, the annular passageway defines an angle with the longitudinal axis which is less than about 30 degrees.

The torch of the present invention further includes an electrode having a discharge end which is mounted in longitudinal alignment with the nozzle base and the lower nozzle member, and means for generating an electrical arc which extends from the electrode and through the bore and the discharge opening to a workpiece located adjacent and below the lower nozzle member. Means are also provided for generating a vertical flow of gas between the electrode and the nozzle base so as to create a plasma flow outwardly through the bore and the discharge opening and to the workpiece, and means are also provided for introducing a liquid, such as water, into the annular passageway of the nozzle assembly so that the water flows outwardly therefrom and envelopes the plasma flow as it passes through the discharge opening.

In one conventional torch of this type, the water injection nozzle includes a frusto conical passageway, which forms a relatively large angle, typically at least about 45°, with respect to the longitudinal axis of the torch. In accordance with the present invention, it has been found that by significantly reducing this angle so as to be less than about 30°, the above-stated objects of the present invention can be achieved. In particular, the smaller angle has been found to permit the wall of the base member to be more thin, which in turn permits the assembly to be more efficiently cooled with less water, and in addition, there is less over cooling of the plasma arc flow.

In one embodiment of the present invention, the annular outer surface of the nozzle base and the annular inner surface of the lower nozzle are both frusto conical, so as to define a frusto conical passageway with a uniform gap width along its length. In another embodiment, the outer and inner surfaces are essentially cylindrical, so as to define an essentially cylindrical passageway.

BRIEF DESCRIPTION OF THE DRAWINGS

Some of the objects and advantages of the present invention having been stated, others will appear as the description proceeds, when considered in conjunction with accompanying drawings, in which.

DETAILED DESCRIPTION OF THE PREFERRED EMBODIMENTS

Figure 1:
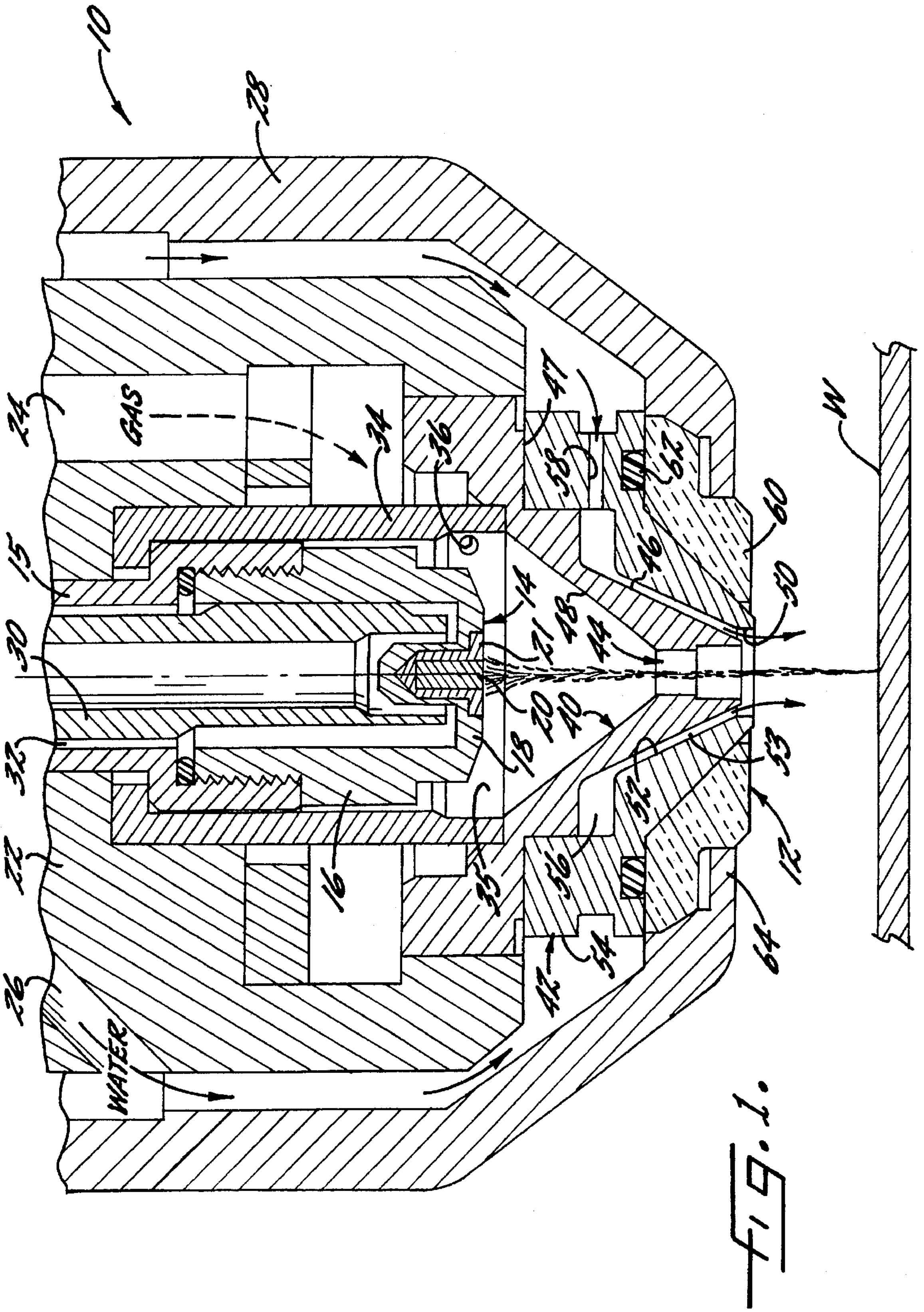
FIG. 1 is a fragmentary sectioned side elevation view of the lower portion of a plasma arc torch which embodies the features of the present invention.

Referring now to the drawings, and more particularly to FIG. 1, there is disclosed a first embodiment plasma arc torch 10 which includes the features of the present invention. The plasma arc torch 10 includes a nozzle assembly 12 and a tubular electrode 14 defining a longitudinal axis. The electrode 14 is preferably made of copper or a copper alloy, and it is composed of an upper tubular member 15 and a lower member or holder 16 which is threadedly connected to the upper member 15. The holder 16 also is of tubular construction, and it includes a transverse end wall 18 which closes the front end of the holder 16 and which defines an outer front face. An emissive insert 20 is mounted in a cavity in the transverse end wall 18 and is disposed coaxially along the longitudinal axis of the torch. A relatively non-emissive sleeve 21 may be positioned coaxially about the insert 20, as is conventional.

In the illustrated embodiment, as shown in FIG. 1, the electrode 14 is mounted in a plasma arc torch body 22, which has gas and liquid passageways 24 and 26. The torch body 22 is surrounded by an outer insulated housing member 28.

A tube 30 is suspended within the central bore of the upper tubular member 15 for circulating a liquid medium such as water through the interior of the electrode structure. The tube 30 has an outer diameter which is smaller than the inner diameter of the bore to provide a space 32 for the water to flow upon discharge from the tube 30. The water flows from a source (not shown) through the tube 30, and back through the space 32 to an opening of the torch body and to a drain hose (not shown).

The gas passageway 24 directs gas from a suitable source (not shown), through a conventional gas baffle 34 of any suitable high temperature ceramic material and into a gas plenum chamber 35 via several radial inlet holes 36 in the wall of the baffle 34. The inlet holes 36 are arranged so as to cause the gas to enter the plenum chamber 35 in a swirling fashion as is well-known.

The nozzle assembly 12 is mounted adjacent and below the discharge end wall 18 of the electrode, and it includes a nozzle base 40 and a lower nozzle member 42. The nozzle base 40 is preferably formed from copper or a copper alloy, and it has a bore 44 therethrough that is aligned with the longitudinal axis and through which the plasma is ejected. The nozzle base 40 further includes an outer side which includes an outer frusto conical surface 46 which tapers toward and is coaxial with the longitudinal axis, and an exterior mounting shoulder 47 positioned longitudinally above the outer frusto conical surface 46. The nozzle base 40 also includes a frusto conical interior surface 48 which tapers toward and is coaxial with the longitudinal axis. In the illustrated embodiment, the bore 44 includes a first bore section **44*a* positioned closest to the electrode and a second bore section 44*b* defining the exit end of the bore and having a diameter slightly greater than the diameter of the first bore section 44*a***.

The lower nozzle member 42, which also may be formed of copper or copper alloy, is mounted to the outer side of said nozzle base and includes a discharge opening 50 which is aligned with the longitudinal axis and positioned adjacent the bore 44 of said nozzle base. The lower nozzle member 42 further includes an inner frusto conical surface 52 spaced from and coaxial with the frusto conical surface 46 of the nozzle base so as to define a frusto conical passageway 53 therebetween. The lower nozzle member 42 also has an annular collar 54 which is closely fitted upon the mounting shoulder 47 of the nozzle base and so as to define an annular open chamber 56 between the nozzle base and the lower nozzle member which communicates with the frusto conical passageway 53. Also, in accordance with the present invention, the frusto conical passageway 53 defines an angle β with longitudinal axis which is less than about 30 degrees.

A plurality of radial ducts 58 extend through the annular collar 54 of the lower nozzle member and communicate with the annular open chamber 56. A water flow path is defined by the housing member 28 and which extends from the water delivery passageway 26 to the area surrounding the annular collar 54, so that the water flows through the ducts 58 and thus into and through the frusto conical passageway 53. The ducts 58 in the annular collar 54 may be tangentially inclined so as to impart a swirling movement to the water as it enters the frusto conical passageway 53.

Also in the case of the present invention, the nozzle base 40 and the lower nozzle member 42 each define a lower terminal end, and the terminal end of the lower nozzle member is longitudinally below the terminal end of the base member a distance G of less than about 0.05 inches. The bore 44 of the base member has a diameter of between about 0.06 and 0.16 inches at the second bore portion **44*b*, and the discharge opening 50** in the lower nozzle member has a diameter of between about 0.10 and 0.22 inches.

A ceramic insulator, indicated generally at 60, is secured onto the lower nozzle member 42 and extends substantially along the outer surface of the lower nozzle member. The ceramic insulator 60 helps prevent double arcing and insulates the lower nozzle member 42 from heat and plasma generated during torch operation. The ceramic insulator 60 may be glued onto the outer surface of the lower nozzle member 42, and an O-ring 62 is positioned to create a seal between the ceramic insulator and the lower nozzle member.

The outer housing member 28 of the torch has a lip 64 at its forward end, which engages an annular shoulder of the insulator 60, thereby securing the lower nozzle member and nozzle base in position adjacent the electrode 14.

A power source (not shown) is connected to the torch electrode 14 in a series circuit relationship with a metal workpiece W, which typically is grounded. In operation, an electrical arc is generated between the emissive insert of the torch 10 and which extends through the bore 44 and the discharge opening 50 to a workpiece W located adjacent and below the lower nozzle member. The plasma arc is started in conventional manner by momentarily establishing a pilot arc between the electrode 14 and the nozzle assembly 12. The arc then is transferred to the workpiece and is ejected through the arc restricting bore 44 and opening 50. The vertical flow of gas which is formed between the electrode and the inner surface 48 of the nozzle base, surrounds the arc and forms a plasma jet, and the swirling vortex of water exiting from the passageway 53 envelopes the plasma jet as it passes through the opening.

Figure 2:
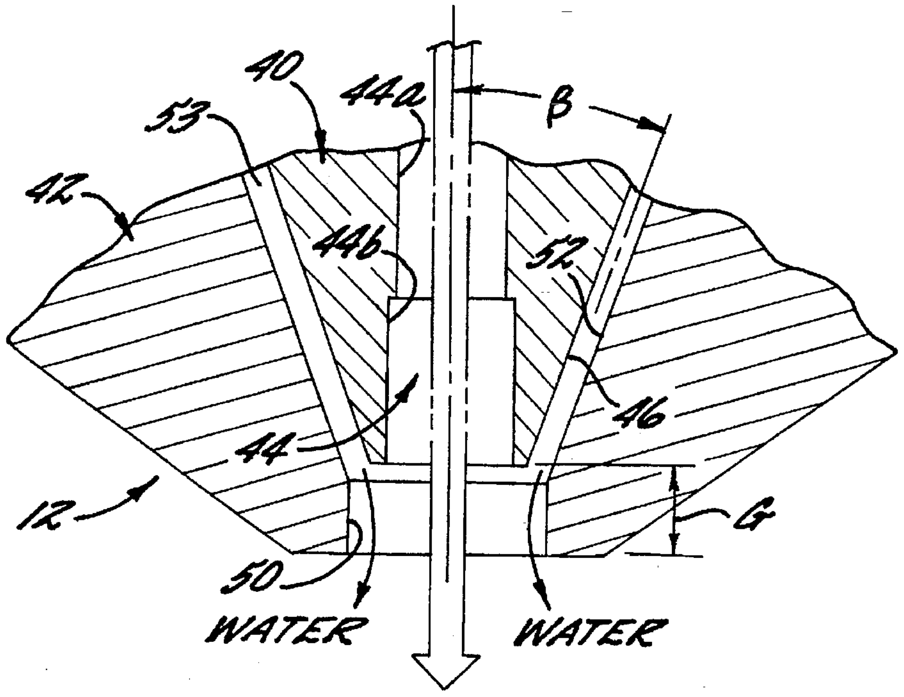
FIG. 2 is a fragmentary and enlarged sectional view of the nozzle assembly of the torch shown in FIG. 1.
Figure 3:
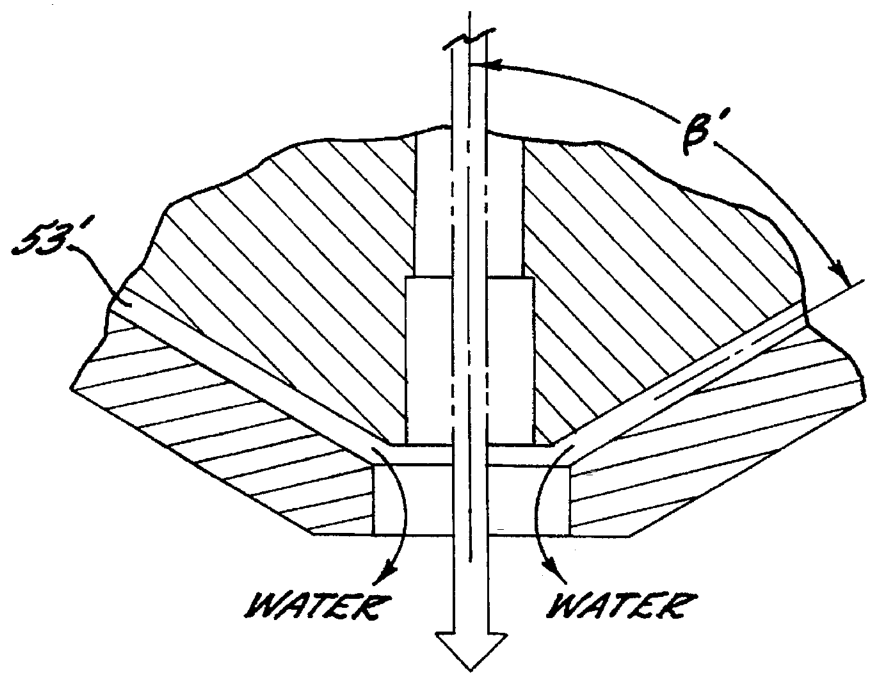
Fig. 3. (PRIOR ART)
FIG. 3 is a view similar to FIG. 2 but illustrating the prior art construction.

FIGS. 2 and 3 compare the present invention with the prior art construction. As illustrated in FIG. 3, the frusto conical water passageway 53' of the prior art torches of the water injection type forms an angle β' of about 45° with the longitudinal axis. Further information regarding a prior art torch of this type may be found in U.S. Pat. Nos. 5,023,425 and 5,124,525, the disclosures of which are expressly incorporated herein by reference.

With the present invention, and as illustrated in FIG. 2, the angle β is less than about 30°. As indicated above, it has been found that the smaller angle of the present invention has been found to permit the wall of the nozzle base 40 to be more thin, which promotes more efficient cooling of the nozzle assembly and without unduly cooling the plasma arc flow with the attendant reduction in its cutting effectiveness.

Figure 4:
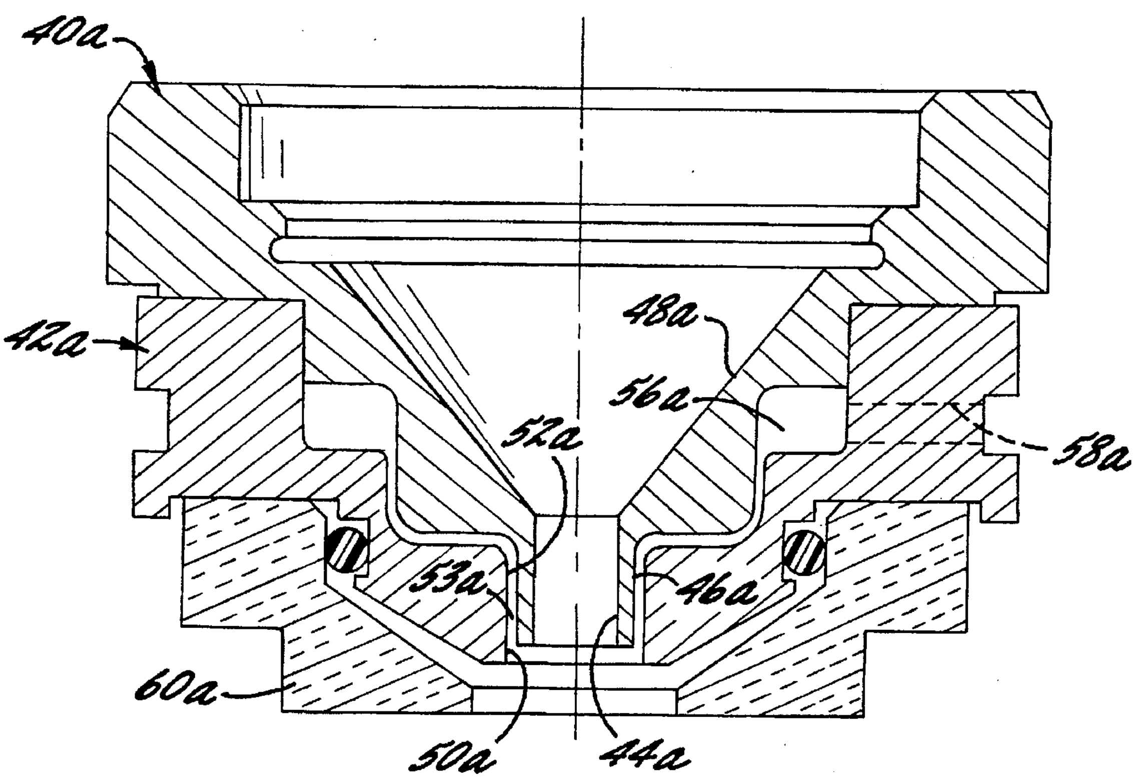
FIG. 4 is a sectional view of a second embodiment of the nozzle assembly of the present invention.

FIG. 4 illustrates a second embodiment of a nozzle assembly which embodies the present invention, with corresponding components being designated with the same numeral as in the first embodiment with a subscript "a". In particular, the second embodiment includes a nozzle base **40*a*, a lower nozzle member 42*a*, and a ceramic insulator 60*a*. The nozzle base 40*a* includes an outer side which includes an outer essentially cylindrical surface 46*a* which is coaxial with the longitudinal axis. The lower nozzle member 42*a* includes an inner essentially cylindrical surface 52*a* which is coextensive with the discharge opening 50*a* of the lower nozzle member. The surface 52*a* is also spaced from and coaxial with the outer surface 46*a* to define an essentially cylindrical passageway 53*a* therebetween, which communicates with the discharge opening 50*a* of the lower nozzle member. Thus in this embodiment, the water exits the passageway 53*a* in the form of an annular tube which is essentially parallel to the longitudinal axis. The passageway 53*a*** may however be slightly frusto conical, so as to define an angle with the longitudinal axis of between about 0° and 10°.

In one specific example of the present invention, a 350 amp torch is provided, and the nozzle base 40 of the torch has a bore diameter of about 0.12 inches at its lower end. The discharge opening 50 of the lower nozzle member of the torch has a diameter of about 0.18 inches, and the longitudinal gap G between the terminal end of the lower nozzle member and the terminal end of the nozzle base is about 0.018 inches. The water passageway 53 defines an angle of about 0° with respect to the longitudinal axis, and the opposing surfaces 46, 52 are separated a distance of about 0.013 inches uniformly along the length of the passageway. In operation, the water flow rate is about ½ gallons per minute.

In the drawings and specification, there has been set forth a preferred embodiment of the invention, and although specific terms are employed, they are used a generic and descriptive sense only and not for purposes of limitation.

That which is claimed is:

1. A plasma arc torch comprising an electrode having a discharge end and defining a longitudinal axis, a nozzle base mounted adjacent the discharge end of the electrode and having a bore therethrough that is aligned with the longitudinal axis and through which the plasma is ejected, said nozzle base further including an outer side which includes an annular outer surface which is coaxial with said longitudinal axis, a lower nozzle member mounted to said outer side of said nozzle base and including a discharge opening aligned with the longitudinal axis and positioned adjacent said bore of said nozzle base, and further including an annular inner surface spaced from and coaxial with said outer surface of said nozzle base so as to define an annular passageway therebetween which communicates with said discharge opening, and with said passageway defining an angle with said longitudinal axis which is less than about 30 degrees, means for generating an electrical arc extending from the electrode and through the bore and the discharge opening to a workpiece located adjacent and below the lower nozzle member, means for generating a vertical flow of gas between the electrode and the nozzle base so as to create a plasma flow outwardly through the bore and the discharge opening and to the workpiece, and means for introducing a liquid into said passageway so that the liquid flows outwardly therefrom and envelopes the plasma flow as it passes through the discharge opening.

2. The plasma arc torch as defined in claim 1 wherein said passageway is frusto conical and has a substantially uniform gap width along its length.

3. The plasma arc torch as defined in claim 1 wherein said passageway is essentially cylindrical.

4. The plasma arc torch as defined in claim 1 wherein said nozzle base and said lower nozzle member each define a lower terminal end, and wherein the terminal end of said lower nozzle member is longitudinally below the terminal end of said base member.

5. The plasma arc torch as defined in claim 4 wherein said bore of said base member has a diameter which is less than the diameter of the discharge opening in said lower nozzle member.

6. The plasma torch as defined in claim 1 further comprising a ceramic insulator secured to the side of the lower nozzle member which is opposite said inner surface thereof.

7. The plasma torch as defined in claim 1 wherein said nozzle base includes a frusto conical interior surface which tapers toward and is coaxial with said longitudinal axis.

8. The plasma arc torch as defined in claim 1 wherein said outer side of said nozzle base further includes an exterior mounting shoulder positioned longitudinally above the outer surface thereof, and wherein said lower nozzle member includes an annular collar which is closely fitted upon said mounting shoulder and so as to define an annular open chamber between said nozzle base and said lower nozzle member which communicates with said passageway.

9. The plasma arc torch as defined in claim 8 wherein said means for introducing a liquid into said passageway includes at least one radial duct extending through said annular collar and communicating with said annular open chamber.

10. A nozzle assembly adapted for use with a plasma arc torch and comprising a nozzle base having a bore therethrough which defines a longitudinal axis and through which plasma is adapted to be ejected, said nozzle base further including an outer side which includes an annular outer surface which is coaxial with said longitudinal axis, and a lower nozzle member mounted to said outer side of said nozzle base and including a discharge opening aligned with the longitudinal axis and positioned adjacent said bore of said nozzle base, and further including an annular inner surface spaced from and coaxial with said outer surface of said nozzle base so as to define an annular passageway therebetween which communicates with said discharge opening, and with said passageway defining an angle with said longitudinal axis which is less than about 30 degrees.

11. The nozzle assembly as defined in claim 10 wherein said annular passageway is frusto conical and has a substantially uniform gap width along its length.

12. The nozzle assembly as defined in claim 10 wherein said annular passageway is essentially cylindrical.

13. The nozzle assembly as defined in claim 11 wherein said nozzle base and said lower nozzle member each define a lower terminal end, and wherein the terminal end of said lower nozzle member is longitudinally below the terminal end of said base member a distance of less than about 0.05 inches.

14. The nozzle assembly as defined in claim 10 wherein said bore of said base member has a diameter of between about 0.06 and 0.16 inches, and wherein the discharge opening in said lower nozzle member has a diameter of between about 0.10 and 0.22 inches.

15. The nozzle assembly as defined in claim 10 further comprising a ceramic insulator secured to the side of the lower nozzle member which is opposite said inner surface thereof.

16. The nozzle assembly as defined in claim 10 wherein said nozzle base includes a frusto conical interior surface which tapers toward and is coaxial with said longitudinal axis.

17. The nozzle assembly as defined in claim 10 wherein said outer side of said nozzle base further includes an exterior annular mounting shoulder positioned longitudinally above the outer surface thereof, and wherein said lower nozzle member includes an annular collar which is closely fitted upon said mounting shoulder and so as to define an annular open chamber between said nozzle base and said lower nozzle member which communicates with said passageway.

18. The nozzle assembly as defined in claim 17 further including at least one radial duct extending through said annular collar and communicating with said annular open chamber.

19. The nozzle assembly as defined in claim 10 wherein said annular passageway defines an angle with said longitudinal axis of between about 0° and 10°.

* * * * *

UNITED STATES PATENT AND TRADEMARK OFFICE

CERTIFICATE OF CORRECTION

PATENT NO. : 5,660,743

DATED : August 26, 1997

INVENTOR(S) : Valerian Nemchinsky

It is certified that error appears in the above-identified patent and that said Letters Patent is hereby corrected as shown below:

Col. 1, line 58, delete "vertical" and substitute --vortical-- therefor;

Col. 4, lines 19, delete "vertical" and substitute --vortical-- therefor; and

Col. 5, line 36, delete "vertical" and substitute --vortical-- therefor.

Signed and Sealed this

Fifteenth Day of September, 1998

*Attest:*

Bruce Lehman

BRUCE LEHMAN

*Attesting Officer*

*Commissioner of Patents and Trademarks*